UNITED STATES PATENT OFFICE.

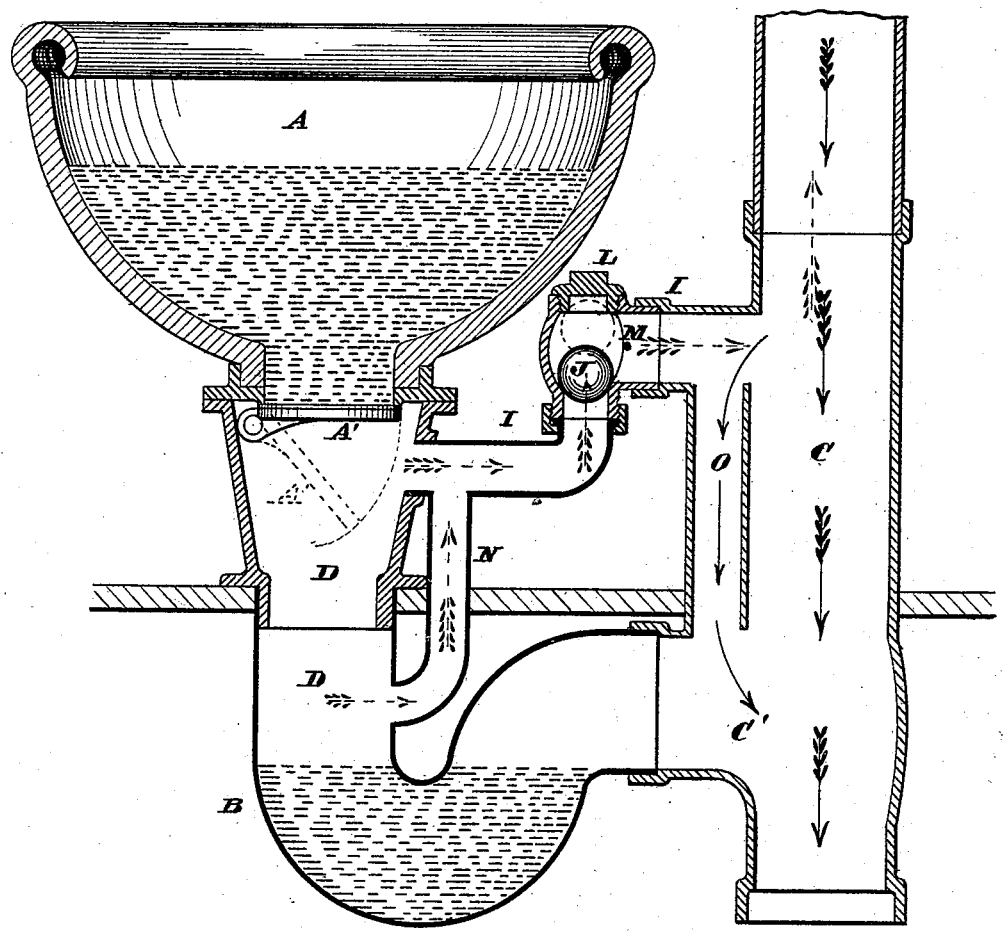

WILLIAM H. GRAHAM, OF ST. LOUIS, MISSOURI.

WATER-CLOSET ATTACHMENT.

SPECIFICATION forming part of Letters Patent No. 326,496, dated September 15, 1885.

Application filed March 12, 1884. (No model.)

*To all whom it may concern:*

Be it known that I, WILLIAM H. GRAHAM, of the city of St Louis, in the State of Missouri, have invented a certain new and useful Improvement in Water-Closet Attachments, of which the following is a full, clear, and exact description, reference being had to the accompanying drawing, forming part of this specification.

My invention consists in features of novelty hereinafter fully described, and pointed out in the claims.

The drawing is a vertical section.

A represents the bowl, B the trap, and C the waste or discharge pipe, of a water-closet, all of which are of any ordinary construction; and the bowl A is provided with a valve, A', as usual, operated by any well-known means, and water is discharged into the bowl in the usual manner.

The chamber D, between the bottom of the bowl and the water-line of the trap, is connected to the waste pipe by a pipe, I, and in this pipe I prefer to place an automatic valve, J, inserted by removing a screw-plug, L, prevented from being forced into the waste-pipe by a wire or rod, M, or its equivalent. I have shown part of the pipe consisting of a casting which is properly jointed to the pipe proper and to the waste-pipe, and in this part the automatic valve is located. I have shown a ball-valve, but do not wish to confine myself to any particular form of automatic valve that would answer the purpose.

The pipe I connects with the upper part of the chamber D, and a branch pipe, N, may be used to connect the lower part of the chamber with the pipe I.

Gases will collect in the chamber D, and when the valve A' of the bowl is opened the water falling from the bowl into the chamber will compress the gases, forcing them out through the pipe I and the branch pipe N if it is used, as shown by the dotted arrows, into the pipe C, through which they escape. The valve J is opened by the pressure of the escaping gases, and as soon as the gases escape it returns to its seat, preventing the sewer-gases or any gases in the pipe C entering the chamber D.

When the water is emptied from the bowl into the trap, and the water in the trap forced into the waste-pipe, the opening C' from the trap into the pipe is liable to become filled with water, forming a siphon that will draw the water out of the trap, thus leaving a passage for the gases from the pipe C into the chamber D, and thus the function of the trap is entirely lost. I prevent the forming of this siphon by means of an air-passage or port, O, back of the opening C'.

I claim—

1. The combination of a soil or waste pipe, a hopper, a chamber beneath the hopper, a trap between the chamber and waste-pipe, a valve between the hopper and chamber, a pipe connecting the chamber with the waste-pipe, and an automatic valve in the pipe adapted to be opened by the gases forced from the chamber by the water-pressure when the hopper-valve is opened and preventing gases from the waste-pipe entering the chamber.

2. The combination of a waste-pipe, a hopper, valve to the hopper, chamber beneath the hopper, trap connecting the chamber with the waste-pipe, ventilating-pipe extending from the upper part of the chamber to the waste-pipe, a branch pipe extending from the lower part of the chamber to the ventilating-pipe.

3. In combination with the bowl, trap, and waste-pipe of a water-closet, the air passage or port O, to prevent a siphon being created between the trap and waste-pipe, substantially as shown and described.

WILLIAM H. GRAHAM.

In presence of—
GEO. H. KNIGHT,
J. E. KNIGHT.